(12) United States Patent
Nagasawa et al.

(10) Patent No.: US 7,605,638 B2
(45) Date of Patent: Oct. 20, 2009

(54) SEMICONDUCTOR INTEGRATED CIRCUIT INCLUDING CHARGE PUMP CIRCUIT

(75) Inventors: Toshinobu Nagasawa, Osaka (JP); Taku Kobayashi, Kyoto (JP); Tetsushi Toyooka, Kyoto (JP); Keiichi Fujii, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/773,066

(22) Filed: Jul. 3, 2007

(65) Prior Publication Data
US 2008/0122522 A1 May 29, 2008

(30) Foreign Application Priority Data
Jul. 5, 2006 (JP) ............................ 2006-185259

(51) Int. Cl.
G05F 1/10 (2006.01)
G05F 3/02 (2006.01)

(52) U.S. Cl. ...................................... 327/536; 327/537

(58) Field of Classification Search ................. 327/536, 327/537
See application file for complete search history.

(56) References Cited

U.S. PATENT DOCUMENTS 6,483,377 B2   11/2002  White et al.
7,323,914 B2 *  1/2008  Hashimoto ................... 327/148
2002/0075705 A1  6/2002  Bayer et al.
2005/0046464 A1  3/2005  Kobayashi et al.
2007/0024347 A1 *  2/2007  Nagasawa et al. ........... 327/536

FOREIGN PATENT DOCUMENTS

JP   2005-79828 A   3/2005
JP   2007-37370 A   2/2007

* cited by examiner

*Primary Examiner*—Lincoln Donovan
*Assistant Examiner*—John W Poos
(74) *Attorney, Agent, or Firm*—RatnerPrestia

(57) ABSTRACT

A semiconductor integrated circuit that suppresses steep changes of an output voltage when starting of a charge pump circuit to suppress transient displacement of output of a circuit block operating independently of the charge pump circuit is provided.

A semiconductor integrated circuit has: a charge pump circuit which charges a first capacitor with an input voltage, transfers a charge accumulated in the first capacitor to a second capacitor, outputs, as an output voltage, a voltage of the second capacitor, and is capable of changing over a capability of charging the second capacitor; a first circuit block that receives a positive voltage and a grounding potential; and a second circuit block that receives the positive voltage and the output voltage of the charge pump. The semiconductor integrated circuit suppresses the charging capability by the charge pump circuit when starting of the charge pump circuit.

4 Claims, 14 Drawing Sheets

SEMICONDUCTOR INTEGRATED CIRCUIT INCLUDING CHARGE PUMP CIRCUIT

BACKGROUND OF THE INVENTION

1. Field of the Invention

The invention relates to a semiconductor integrated circuit having a charge pump circuit.

2. Related Art

In battery-driven portable appliances, recently, a supply voltage tends to be lowered in order to realize operation for a long time at low power consumption. On the other hand, in a signal processing circuit of a semiconductor integrated circuit, it is required to output a voltage of same amplitude as that in prior art, or a voltage of larger amplitude than that in prior art. If a voltage of sufficient signal amplitude cannot be output due to the low supply voltage, by raising or lowering the voltage by a DC-DC converter, a desired DC voltage is generated in the appliance, and this DC voltage is utilized for outputting a voltage of sufficient signal amplitude.

A DC-DC converter using a charge pump circuit is widely employed in portable appliances. Further, in order to curtail a mounting area, a new semiconductor integrated circuit in which a charge pump circuit and a circuit block for processing a signal are mounted on a same substrate is put into practical use.

JP-A-2005-79828 discloses a conventional semiconductor integrated circuit including a negative voltage charge pump circuit. As shown in FIG. 13, the conventional semiconductor integrated circuit 100 includes a negative voltage charge pump circuit 11, a gate driving circuit 2 that controls the voltage to be applied to a gate terminal of the charge pump circuit 11, a circuit block 3 that performs specified signal processing in a state supplied with a positive voltage VCC and a grounding potential (GND) as a power source, a circuit block 4 that performs specified signal processing in a state supplied with the positive voltage VCC and an output voltage VSS of the charge pump circuit 11 as a power source, and a switch 5 that sets the output of the charge pump circuit 11 at low impedance by connecting the output of the charge pump circuit 11 with the GND. These internal circuits of the semiconductor integrated circuit 100 are integrated on a same substrate.

The charge pump circuit 11 is connected to both ends of a flying capacitor C1 that is used for charge by the charge pump circuit 11, and one end of an output capacitor C2 having the other end connected to the GND. The charge pump circuit 11 operates by receiving drive voltages $\Phi1$, $\Phi2$, $\Phi3$, and $\Phi4$ as clock signals in the gate terminal from the gate driving circuit 2, and outputs the output voltage VSS of negative voltage.

In the conventional semiconductor integrated circuit 100, when operating only the circuit block 3 by stopping the circuit block 4 in order to save current consumption, the operation of the circuit block 4 is set in power-saving mode and the charge pump circuit 11 is stopped. When the circuit block 4 operates, the charge pump circuit 11 is started. The conventional semiconductor integrated circuit 100 has the switch 5 that connects the output of the charge pump circuit 11 with the GND so as not to latch up when the operation of the charge pump circuit 11 is stopped, FIG. 14 shows waveforms of the output voltage VSS of the charge pump circuit 11 and the output voltage Vout of the circuit block 3 when the charge pump circuit 11 is changed in on/off mode. In FIG. 14, the charge pump circuit 11 starts operation at time T1, and the charge pump circuit 11 stops operation at time T2.

At time T1, firstly, the switch 5 is turned off from on. The charge pump circuit 11 starts to operate by starting input of specified clock signals $\Phi1$, $\Phi2$, $\Phi3$, and $\Phi4$ from the gate driving circuit 2 in a state in which the input voltage VCC is applied to the charge pump circuit 11. When the charge pump circuit 11 starts operation, the output voltage VSS of the charge pump circuit 11 drops suddenly, and reaches voltage level (−VCC). This output voltage VSS is a substrate potential of the semiconductor integrated circuit 100, and due to sudden drop of the output voltage VSS, the output voltage Vout of the circuit block 3 generates a transient negative peak voltage Vn.

At time T2, when the gate driving circuit 2 stops input of clock signals $\Phi1$ to $\Phi4$ to the gate terminal of the charge pump circuit 11, the charge pump circuit 11 stops repetitive operation of charging and discharging. The output voltage VSS of the charge pump circuit 11 elevates to 0 V, and accordingly the output voltage Vout of the circuit block 3 generates a transient positive peak voltage Vp.

In the conventional semiconductor integrated circuit, during operation of the circuit block 3, when the output voltage VSS of the charge pump circuit 11 changes suddenly, the substrate potential of the semiconductor integrated circuit 100 also changes suddenly. When the substrate of semiconductor integrated circuit 100 is a P type substrate, and the circuit block 3 has an NPN transistor, the voltage change of the output voltage VSS of the charge pump circuit 11 propagates to the NPN transistor through a parasitic capacitor formed between the P type substrate of the semiconductor integrated circuit 100 and the collector diffusion layer of the NPN transistor, and the potential change of the voltage VSS is superposed on the signal of the circuit block 3. For example, if the circuit block 3 is a circuit for outputting an audio signal, the signal superposed with the potential change of the voltage VSS passes through an amplifying circuit, and transient sound or other trouble is caused by the output voltage Vout shown at time T1 and T2 in FIG. 14.

In particular, if the circuit block 4 requires a high capability as negative power source, and in order to raise the current supply capability of negative power source supplied by the charge pump circuit 11, it is attempted to increase the size of transistor in the charge pump circuit 11, or to use a output capacitor C2 of less than 10 μF to suppress the mounting area of portable appliance, the charging slope of the output voltage VSS of the charge pump circuit 11 becomes steep, and transient sound or other trouble of the circuit block 3 becomes very obvious.

Although variable depending on the transistor area or gain of an amplifier, for example, in the case of semiconductor integrated circuit containing an audio signal output circuit used in general portable appliance, when the charging slope of the voltage VSS is smaller than 3 V/ms, displacement of transient sound is insignificant, and hearing trouble hardly occurs. However, when a chip capacitor of small mounting area of less than 10 μF suited to portable appliance is used as the output capacitor C2 of the charge pump circuit 11, it is very difficult to maintain a small charging slope of less than 3 V/ms in the prior art.

SUMMARY OF THE INVENTION

To solve the problems of the prior art, it is an object of the invention to present a semiconductor integrated circuit capable of suppressing steep changes of an output voltage when a charge pump circuit starts or stops operating, and suppressing transient displacement of output of a circuit block operating independently of the charge pump circuit.

A semiconductor integrated circuit of the invention includes a charge pump circuit that is connected to a first capacitor and a second capacitor, charges the first capacitor with an input voltage, transfers a charge accumulated in the first capacitor to the second capacitor, outputs, as an output voltage, a voltage of the second capacitor, and is capable of changing over a capability of charging the first or second capacitor, a first circuit block that receives a positive voltage and a grounding potential, as a power source, and a second circuit block that receives the positive voltage and the output voltage of the charge pump, as a power source.

When transferring from non-operating state to operating state of the charge pump circuit, the charging capacity by the charge pump circuit is suppressed, and the displacement slope of the output voltage of the charge pump circuit is lessened, and it is possible to decrease the effect by displacement of output voltage of the charge pump circuit on the first circuit block in operating state. As a result, if the first circuit block receiving a positive voltage and a grounding potential as the power source, and the second circuit block receiving the positive voltage and the output voltage of the charge pump as the power source are integrated on a same semiconductor integrated circuit board, the first circuit block can operate without receiving effects of start/stop of the charge pump circuit. Accordingly, it is possible to mount the first circuit block and the second circuit block on a same semiconductor integrated circuit board, and a semiconductor integrated circuit which has a mounting area substantially saved can be realized.

The charge pump circuit may include a first switch circuit that connects one end of the first capacitor with the input voltage, a second switch circuit that connects the one end of the first capacitor with the grounding potential, a third switch circuit that connects the other end of the first capacitor with the grounding potential, a fourth switch circuit that connects the other end of the first capacitor with the second capacitor, and a changeover circuit that increases a resistance value of at least one of the first to fourth switch circuits, when starting to charge the second capacitor.

The charge pump circuit may have a first switching transistor that connects one end of the first capacitor with the input voltage, a second switching transistor that connects the one end of the first capacitor with the grounding potential, a third switching transistor that connects the other end of the first capacitor with the grounding potential, and a fourth switching transistor that connects the other end of the first capacitor with the second capacitor. The semiconductor integrated circuit may further include a gate driving circuit that outputs a drive voltage for changing over on and off of the first to fourth switching transistors. The gate driving circuit may include a changeover circuit that changes over the drive voltage so as to decrease an ON duty of at least one of the first to fourth switching transistors of the charge pump circuit when starting to charge the second capacitor. Since the gate driving circuit changes the duty ratio of clock waveform and outputs a drive voltage, the charging amount to the capacity connected to the output of the charge pump circuit can be suppressed. Thus, the slope of displacement of output voltage of the charge pump circuit can be gentle.

The charge pump circuit may include a first switching transistor that connects one end of the first capacitor with the input voltage, a second switching transistor that connects the one end of the first capacitor with the grounding potential, a third switching transistor that connects the other end of the first capacitor with the grounding potential, a fourth switching transistor that connects the other end of the first capacitor with the second capacitor, a fifth transistor having a drain and a gate connected to any one gate of the first to fourth switching transistors and having a source connected to any one source of the first to fourth switching transistors, a current source that supplies a current to the drain of the fifth transistor, and a changeover circuit that changes over a period during which the current of the current source flows in the drain of the fifth transistor. One or more switching transistors out of the switching transistors of the charge pump circuit have a current mirror configuration, and when transferring from non-operating state to operating state of the charge pump circuit, the charging and discharging amount to the output capacitor from the charge pump circuit can be suppressed by the changed constant current, and the slope of displacement of the output voltage of the charge pump circuit can be decreased.

When the second capacitor is connected between the output of the charge pump circuit and the grounding potential and has a capacity of 10 µF or less, the charge pump circuit may start charging the second capacitor in a state in which the charging slope of the second capacitor is smaller than 3 V/ms. As a result, the potential displacement of output voltage of the first circuit block can be lessened.

The semiconductor integrated circuit may further include a switch that connects between the output of the charge pump circuit and the grounding potential at low impedance. This switch is not immediately turned on when transferring from operating state to non-operating state of the charge pump circuit, but the output capacitor is gradually discharged by the idling current flowing into the output terminal of the charge pump circuit, and the switch is turned on when the potential of the output terminal of the charge pump circuit is sufficiently close to the GND level, and thereby the slope of output voltage of the charge pump circuit may be lessened. As a result, when transferring from operating state to non-operating state of the charge pump circuit, the potential displacement of the first circuit block can be suppressed.

The first circuit block may output an audio signal. The second circuit block may output a video signal.

According to the invention, the semiconductor integrated circuit can suppress steep changes of an output voltage when starting or stopping operation of a charge pump circuit, and suppress transient displacement of an output voltage of a circuit block operating independently of the charge pump circuit. As a result, it is effective to prevent effects of changes of the output voltage of the charge pump circuit on the circuit block in operating state, and to prevent generation of transient sound due to transfer of state of the charge pump circuit. Hence, a circuit block using the output voltage of the charge pump circuit as a power supply terminal and a circuit block operating independently of the charge pump circuit can be integrated on a same semiconductor board, and a mounting area can be saved substantially. When a chip capacitor of 10 µF or less suited to a portable appliance is used as an output capacitor of the charge pump circuit, a charging slope smaller than 3 V/ms can be realized.

DETAILED DESCRIPTION OF THE PREFERRED EMBODIMENTS

Preferred embodiments showing the best mode for carrying out the invention are described specifically below with reference to the accompanying drawings.

First Embodiment

[1.1] Configuration of Semiconductor Integrated Circuit

Figure 1:
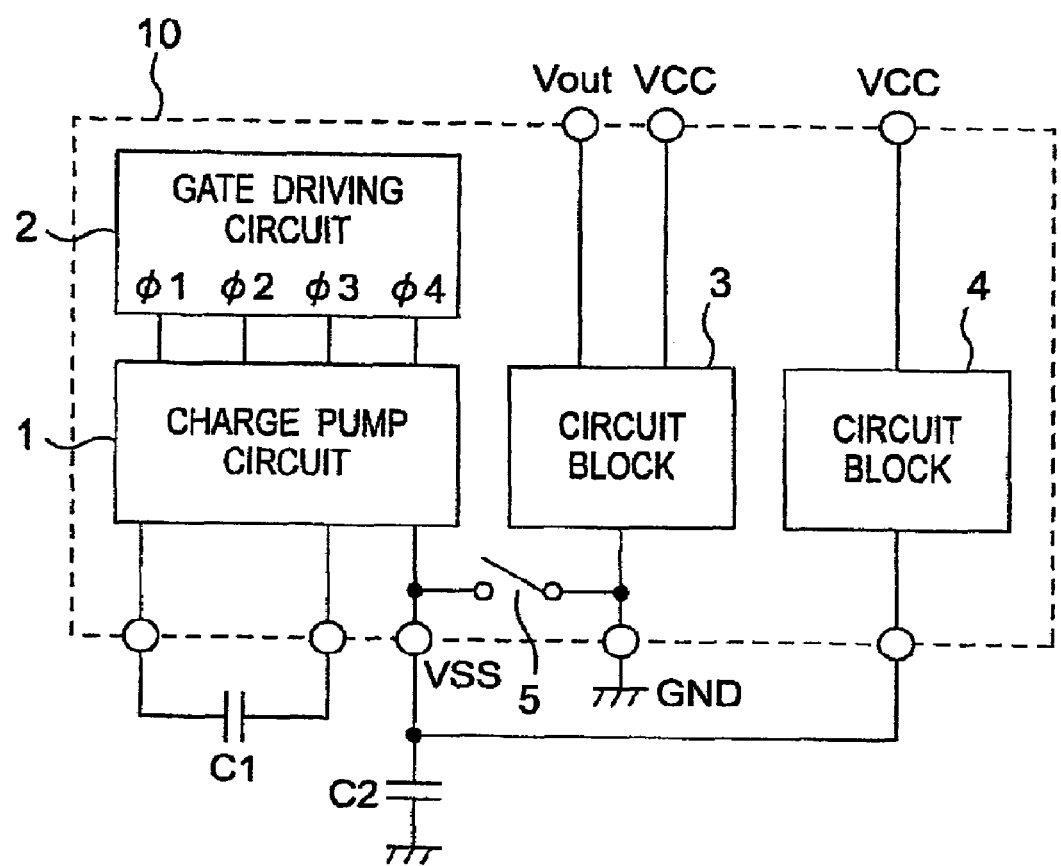
FIG. 1 is a block diagram of a semiconductor integrated circuit in first embodiment to third embodiment of the invention.

FIG. 1 shows a semiconductor integrated circuit in first embodiment of the invention. A semiconductor integrated circuit 10 in the embodiment includes a charge pump circuit 1 of negative voltage type, a gate driving circuit 2 that controls a voltage to be applied to a gate terminal of the charge pump circuit 1, a circuit block 3 that performs a specified signal process in a state supplied with a positive voltage VCC and a grounding potential (GND) as a power source, a circuit block 4 that performs a specified signal process in a state supplied with the positive voltage VCC and an output voltage VSS of the charge pump circuit 1 as a power source, and a switch 5 that sets the output of the charge pump circuit 1 at low impedance by connecting the output of the charge pump circuit 1 with the GND. These internal circuits of the semiconductor integrated circuit 10 are integrated on a same substrate.

The charge pump circuit 1 is connected to both ends of a flying capacitor C1 that is used for charge by the charge pump circuit 1, and one end of an output capacitor C2 having the other end connected to the GND. In the embodiment, the output capacitor C2 is a chip capacitor of 10 μF or less suited to a portable appliance.

In the embodiment, the circuit block 3 is a circuit for outputting an audio signal. The circuit block 4 is an output circuit of output capacitor-less such as video output circuit for outputting mainly a video signal, capable of swinging the signal output to positive and negative polarity.

[1.2] Configuration of Gate Driving Circuit

Figure 2:
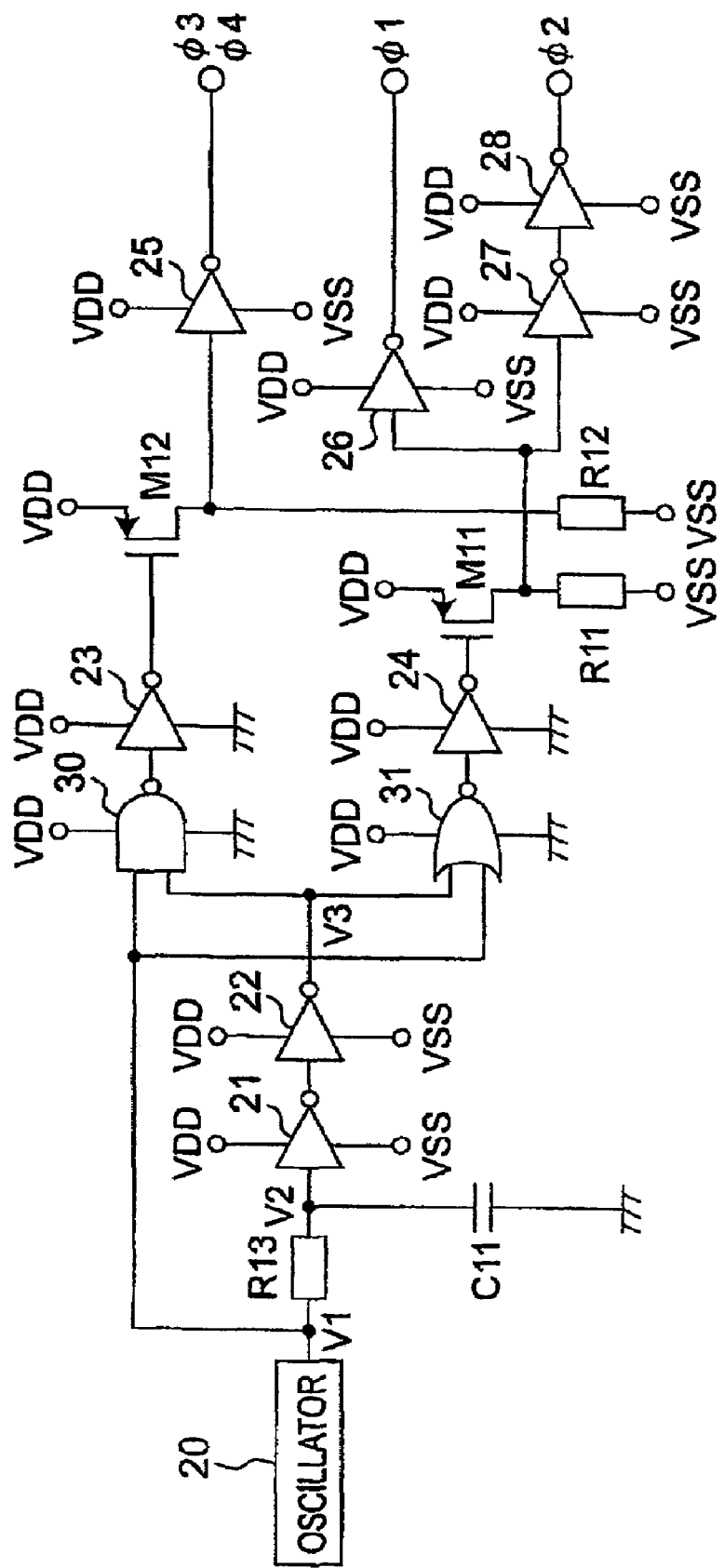
FIG. 2 is a circuit diagram of an internal configuration of a gate driving circuit in first embodiment.

FIG. 2 shows a configuration of the gate driving circuit 2. The gate driving circuit 2 includes an oscillator 20 that generates a voltage V1 of rectangular wave, a primary low pass filer (primary LPF) made of a resistor R13 connected to the oscillator 20 and capacitor C11, an inverter circuit 21 that receives an output voltage V2 of the primary LPF, an inverter circuit 22 connected to the inverter circuit 21, a NAND circuit 30 and a NOR circuit 31 that receive an output voltage V1 of the oscillator 20 and an output voltage V3 of the inverter circuit 22, an inverter circuit 23 connected to the NAND circuit 30, a level shift circuit made of a transistor M12 connected to the inverter circuit 23 and a resistor R12, an inverter circuit 24 connected to the NOR circuit 31, a level shift circuit made of a transistor M11 connected to the inverter circuit 24 and a resistor R11, and inverter circuits 25 to 28 connected to these level shift circuits.

The gate driving circuit 2 outputs an output of the inverter circuit 26 connected to the junction of the transistor M11 and the resistor R11 as a driving voltage Φ1. The output of the level shift circuit 28 connected to the junction of the transistor M11 and the resistor R11 through the level shift circuit 27 is output as a driving voltage Φ2. Further, the gate driving circuit 2 outputs an output of the inverter circuit 25 connected to the junction of the transistor M12 and the resistor R12 as a driving voltage Φ3, and a driving voltage Φ4.

Figure 3:
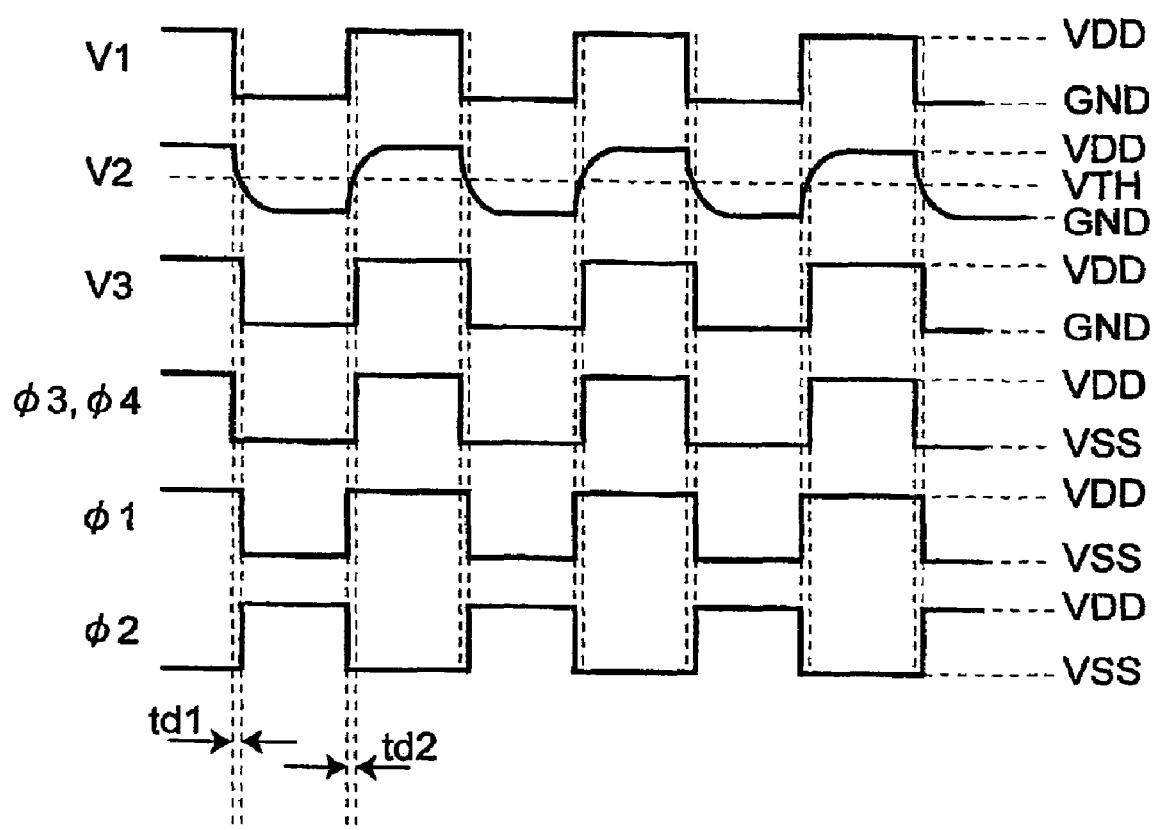
FIG. 3 is an operation waveform diagram of the gate driving circuit in first embodiment.

FIG. 3 shows waveforms of the output voltage V1 of the oscillator 20, the output voltage V2 of the primary LPF, the output voltage V3 of the inverter circuit 22, and the driving voltages Φ1 to Φ4 output by the gate driving circuit 2. As shown in FIG. 3, the gate driving circuit 2 provides time differences (dead times) td1 and td2 so that the driving voltages Φ3 and Φ4 may not be high level (H) simultaneously when the driving voltage Φ1 is low level (L) and the driving voltage Φ2 is high level (H).

[1.3] Configuration of Charge Pump Circuit

Figure 4:
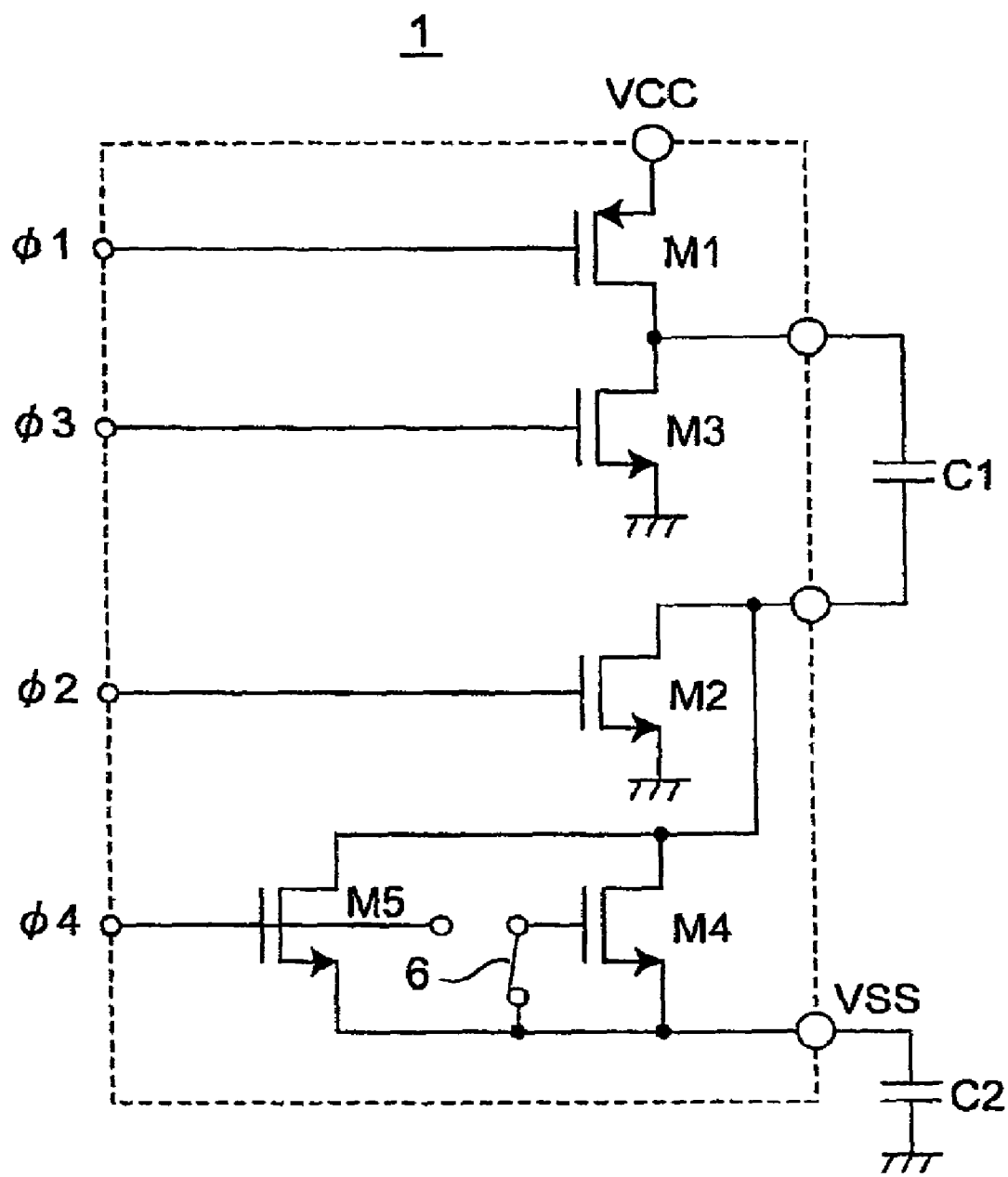
FIG. 4 is a circuit diagram of an internal structure of the charge pump circuit in first embodiment.

FIG. 4 shows a configuration of the charge pump circuit 1 in the embodiment. The charge pump circuit 1 in the embodiment includes a switching transistor M1 that connects one end of the flying capacitor C1 with the input voltage VCC, a switching transistor M3 that connects one end of the flying capacitor C1 with GND, a switching transistor M2 that connects the other end of the flying capacitor C1 with GND, and a switching transistor M4 that connects the other end of the flying capacitor C1 with the output capacitor C2.

The charge pump circuit 1 in the embodiment further includes a switching transistor MS having a gate connected to the driving voltage Φ4, and a drain and a source connected at same potential to a drain and a source of the switching transistor M4, and a switch 6 that connects the gate of the switching transistor M4 to the driving voltage Φ4 or to the source of the switching transistor M4. The ON resistance of the switching transistor M5 is very high as compared with the switching transistor M4. The switching transistor M4 and the switching transistor MS constitute one switch circuit, and the resistance value of the switch circuit can be changed over by the switch 6 as a changeover circuit when charging the output capacitor C2.

When driving voltages Φ1, Φ2, Φ3, and Φ4 as clock signals are entered into the gate terminal of the charge pump circuit 1 from the gate driving circuit 2, the switching transistors M1 to M5 of the charge pump circuit 1 operates. When the driving voltage Φ1 is L, Φ2 is H, and Φ3 and Φ4 are L, both switching transistors M1 and M2 are turned on, the switching transistors M3, M4, and M5 are all turned off, and the flying capacitor C1 is charged with the positive input voltage VCC and GND. When the driving voltage Φ1 is H, Φ2 is L, and Φ3 and Φ4 are H, both switching transistors M1 and M2 are turned off, the switching transistor M3 and switching transistors M4 or M5 are turned on, and the charge accumulated in the flying capacitor C1 is transferred to the output capacitor C2.

In the embodiment, when the charge pump circuit 1 is transferred from non-operating state to operating state, the switch 6 is connected to the source of the switching transistor M4. That is, the voltage is 0 V between the gate and source of the switching transistor M4, and the switching transistor M4 is turned off. In this state, the switching transistor M5 is turned on by the driving voltage Φ4, and charging is started by the switching transistor M5 having high ON resistance. After a specified time, the switch 6 is connected to the driving voltage Φ4 to turn on the switching transistor M4, and charging continues by the switching transistor M4 having low ON resistance.

By this series of operations, the charge pump circuit 1 outputs the output voltage VSS of negative voltage. When the charge pump circuit 1 receives the input voltage VCC, an ideal value of the output voltage VSS is −VCC.

[1.4] Structural Example of NPN Transistor Used in Circuit Block

Figure 5:
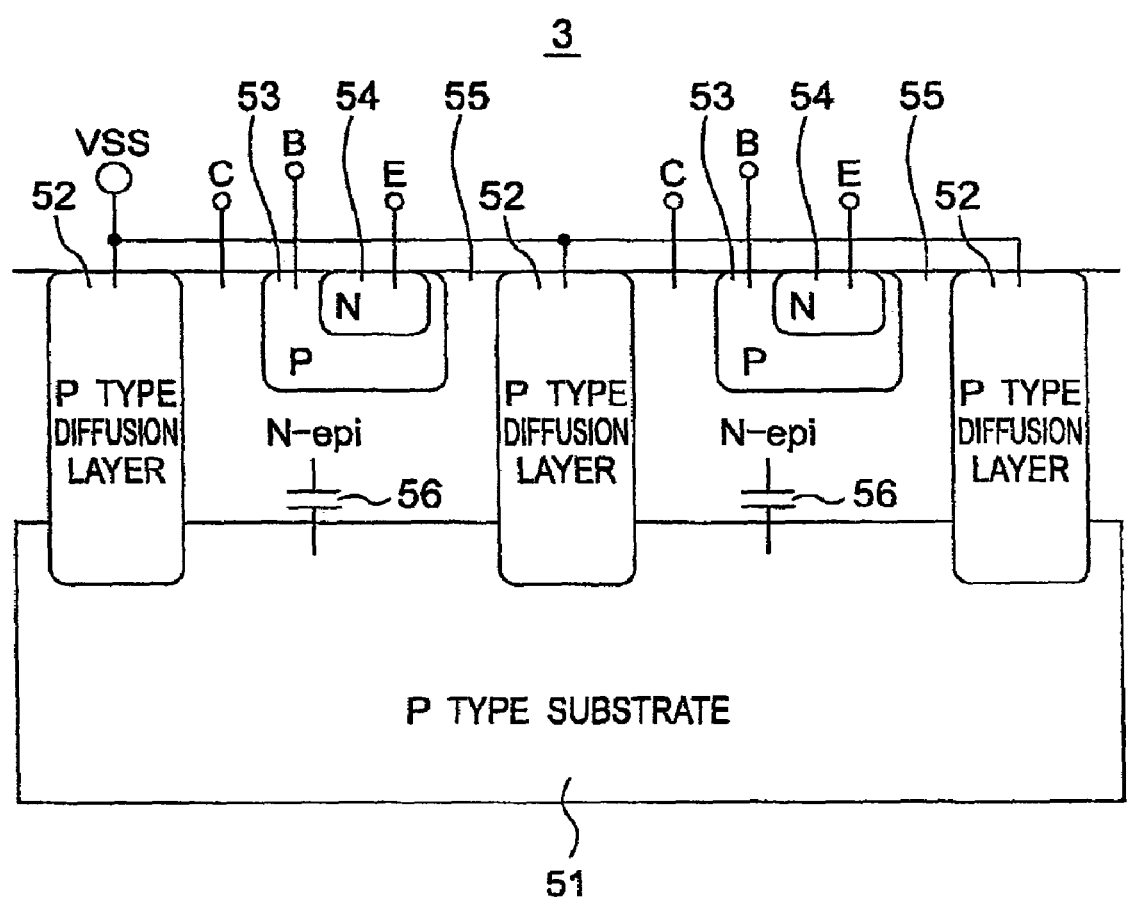
FIG. 5 is a sectional view of a NPN transistor used in a circuit block contained in the semiconductor integrated circuit of the invention.

FIG. 5 is a longitudinal structural diagram of NPN transistor used representatively in circuit blocks 3 and 4. In FIG. 5, a P type substrate 51 is a substrate of the semiconductor integrated circuit 10 in FIG. 1. Each NPN transistor included in the circuit blocks 3 and 4 has a base diffusion layer 53, an emitter diffusion layer 54, and a collector diffusion layer 55, and these diffusion layers are respectively connected to a base terminal B, an emitter terminal E, and a collector terminal C. The each NPN transistors included in the circuit blocks 3 and 4 is isolated by a P type diffusion layer 52 for isolating mutually the elements mounted on the semiconductor integrated circuit 10. A parasitic capacitor (N-epi) 56 is present between the P type substrate 51 and the collector diffusion layer 55.

[1.5] Operation of Semiconductor Integrated Circuit

This is to explain the operation of the semiconductor integrated circuit 10 of the embodiment having such configuration. In the state of simultaneous operation of the circuit block 3 and the circuit block 4, when the circuit block 4 and the charge pump circuit 1 are stopped in order to save current consumption, the operation of the circuit block 4 is set in power saving mode, and the gate driving circuit 2 stops supply of the driving voltages Φ1 to Φ4 to the gate terminal of the charge pump circuit 1. The charge pump circuit 1 stops repetitive operation of charging and discharging. When the charge pump circuit 1 stops its operation and the output voltage VSS of the charge pump circuit 1 becomes high impedance, the voltage VSS which is the substrate potential of the semiconductor integrated circuit 10 becomes higher than GND, and latch-up occurs. In the embodiment, the switch 5 for connecting the GND with the output voltage VSS is turned on from off to prevent the latch-up.

When the charge pump circuit 1 and the circuit block 4 are operated simultaneously with the circuit block 3 after only the circuit block 3 is operated, the switch 5 is turned off from on. The gate driving circuit 2 supplies driving voltages Φ1, Φ2, Φ3, and Φ4 to the charge pump circuit 1. The charge pump circuit 1 starts its operation. In the embodiment, when transferring from non-operating state to operating state of the charge pump circuit 1, the switch 6 shown in FIG. 4 is connected to the source of the switching transistor M4 to turn off the switching transistor M4, and charging is started by the switching transistor M5 having high ON resistance.

Figure 6:
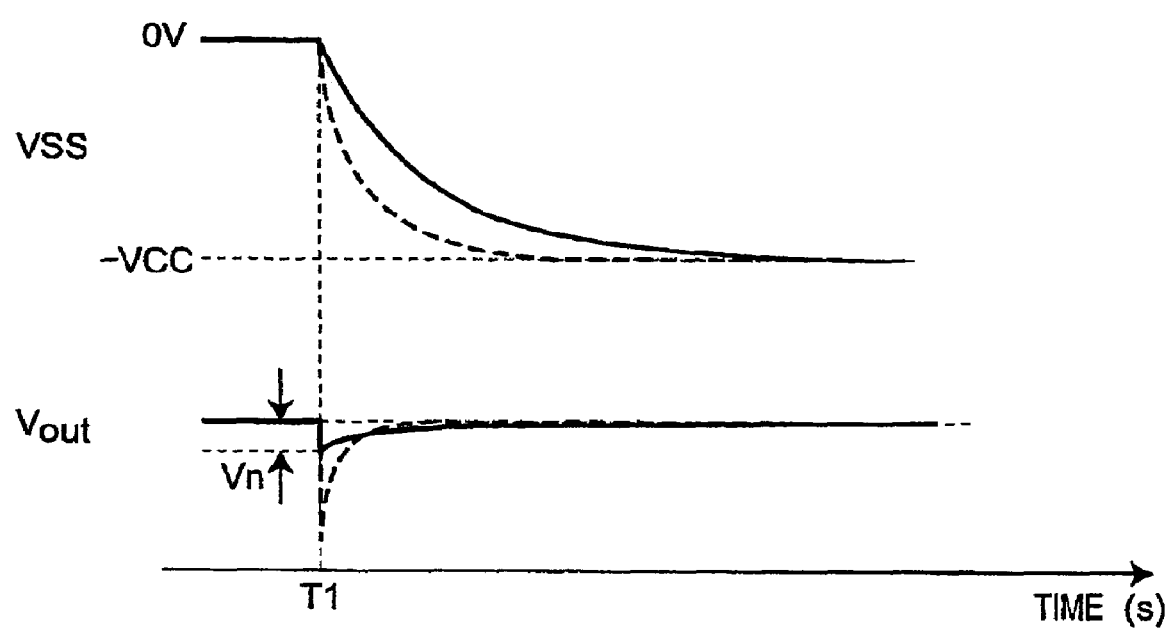
FIG. 6 is a waveform diagram of a transient characteristic of an output voltage VSS of the charge pump circuit, and an output voltage Vout of the circuit block operating between a power source and GND on same substrate, when the charge pump circuit in first embodiment transfers from non-operating state to operating state.

At this time, the transient characteristics of the output voltage VSS of the charge pump circuit 1 and the output voltage Vout of the circuit block 3 become as shown by a solid line in FIG. 6. In FIG. 6, example in which the switching transistor M4 is used from the beginning of operation without using the switching transistor M5, that is, the transient characteristic of the output voltage VSS of the charge pump circuit 11 and the output voltage Vout of the circuit block 3 in prior art is indicated by a broken line for reference. The time T1 is the operation start time of the charge pump circuit 11.

As indicated by the solid line in FIG. 6, the transient response of the output voltage VSS of the charge pump circuit 1 is gentle in charging slope when starting of the charge pump 1 as compared with the conventional response indicated by the broken line. Voltage change of the output voltage VSS of the charge pump circuit 1 is propagated to the NPN transistor by way of the parasitic capacitor 56 formed between the P type substrate 51 of the semiconductor integrated circuit 10 and the collector diffusion layer 55 of the NPN transistor of the circuit block 3, and is superimposed on the signal in the circuit block 3. In the embodiment, however, since the charging slope of the output voltage VSS is less steep, the output voltage Vout of the circuit block 3 receiving the voltage VCC and GND as the power source has a small negative peak voltage value Vn as shown in FIG. 6, and as compared with conventional voltage value indicated by the broken line, the potential displacement is suppressed. As a result, transient sound or other trouble of the circuit block 3 can be prevented.

The switch 6 of the charge pump circuit 1 is connected to the driving voltage Φ4 after a specified time, for example, when the output voltage VSS reaches −VCC, and the charging capability of the charge pump circuit 1 is raised to start operation of the circuit block 4 receiving the output voltage VSS of the charge pump circuit 1 and the voltage VCC as the power source.

Thus, according to the embodiment, in the semiconductor integrated circuit 10 in which the circuit block 4 supplied with power source from the positive voltage VCC and the output voltage VSS of the charge pump circuit 1 and the circuit block 3 supplied with power source from the positive voltage VCC and GND are integrated on a same chip, when transferring from the operating state of only the circuit block 3 in order to save power consumption to the simultaneous operating state of both the circuit block 3 and the circuit block 4, charging is started by the switching transistor M5 having high ON resistance to make slope of fluctuation of the output voltage VSS of starting of the charge pump circuit 1 gentle Accordingly, no effect is caused to the circuit block 3 in operating state.

Since the embodiment can prevent occurrence of transient sound by the circuit block 3 due to state transfer of the charge pump circuit 1, the circuit block 4 driven by the output voltage of the charge pump circuit 1, and the circuit block 3 operating independently of the charge pump circuit 1 can be integrated on a same circuit board. The mounting area can be saved substantially. In case that the chip capacitor of 10 μF or less suited to a portable appliance is used as the output capacitor C2 of the charge pump circuit 1, a smaller charging slope than 3 V/ms can be realized.

The charge pump circuit 1 of the embodiment has the switching transistor M5 provided in parallel to the switching transistor M4, and one switch circuit is formed by the switching transistor M4 and the switching transistor MS, but not limited to this structure. The switching transistor M5 may be provided in parallel to at least one of the switching transistors M1 to M4, and thus the potential displacement of the output voltage VSS of the charge pump circuit 1 may be suppressed.

Further, a plurality of transistors having the drain and source connected commonly to the switching transistor M4, and a plurality of switches capable of changing over the gate potential of each transistor between the driving voltage Φ4 and GND may be provided, and the charging capability may be gradually changed over to higher levels. Thereby, the charging time to −VCC can be shortened.

Figure 7:
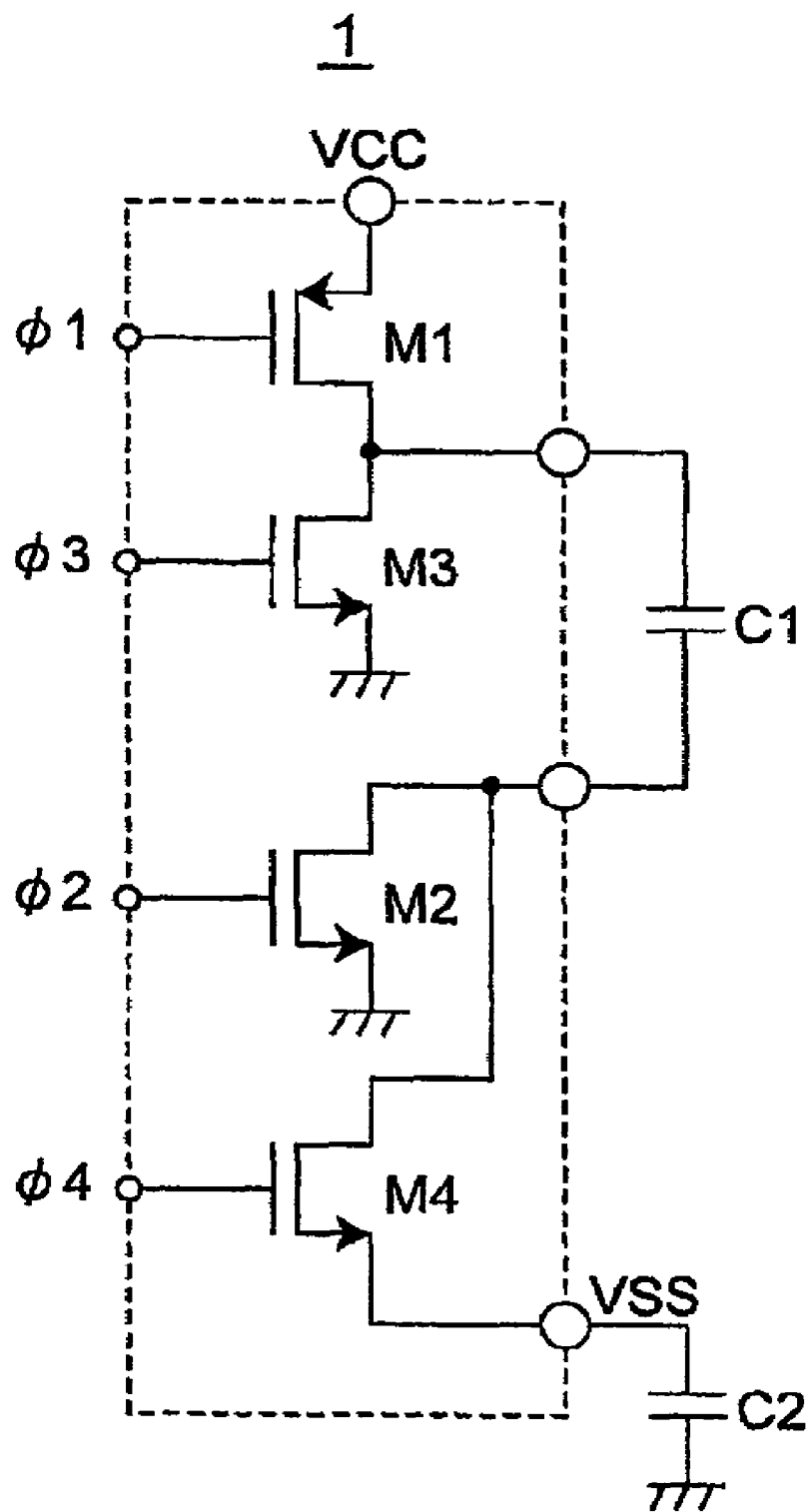
FIG. 7 is a circuit diagram of other example of internal configuration of the charge pump circuit in first embodiment.

Besides, as shown in FIG. 7, the charge pump circuit 1 may not have the switching transistor M5 and the switch 6. In such a case, by suppressing the H level of the voltage Φ4 of the gate of the switching transistor M4 more than usual, the transient response of the output voltage VSS of starting of the charge pump circuit 1 may be less slope, and the potential displacement of the output voltage Vout of the circuit block 3 may be suppressed.

Second Embodiment

Figure 8:
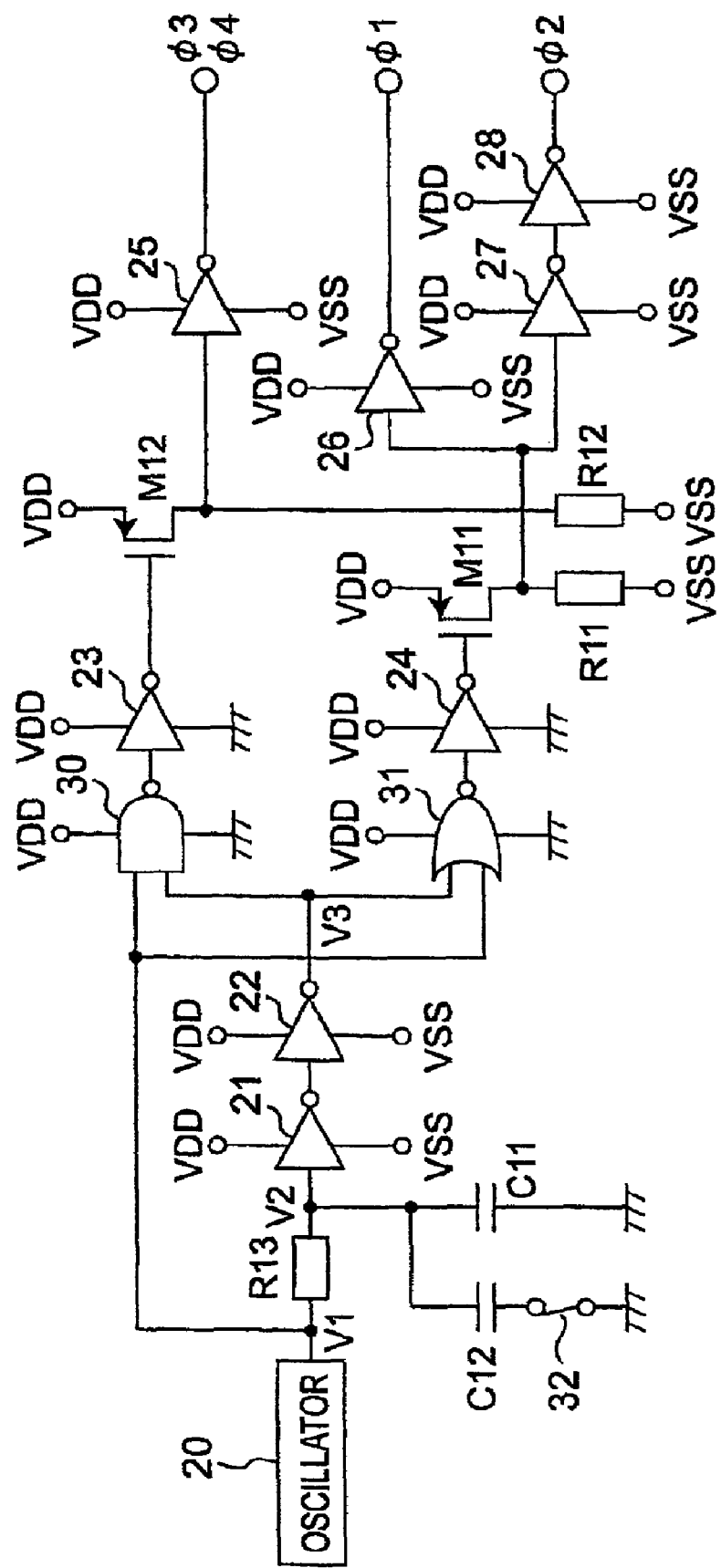
FIG. 8 is a circuit diagram of an internal configuration of a gate driving circuit in second embodiment.

FIG. 8 shows other configurational example of the gate driving circuit included in the semiconductor integrated circuit of the invention. A gate driving circuit 2a of the embodiment is similar to the structure of the first embodiment shown in FIG. 2, except that a capacitor C12 and a switch 32 are added. The capacitor C12 and the switch 32 make a changeover circuit for changing over the driving voltages Φ3 and Φ4 so as to lower the ON duty of switching transistors M3 and M4 of the charge pump circuit 1. In the semiconductor integrated circuit of the embodiment, the structure other than the gate driving circuit 2a is same as that in the first embodiment shown in FIG. 1, and the internal circuit of the charge pump circuit 1 is as shown in FIG. 7.

In the gate driving circuit 2a, one end of the capacitor C12 is connected to one end of the capacitor C11, and the other end of capacitor C12 is connected to one end of the switch 32, and the other end of the switch 32 is connected to the GND. In the embodiment, the primary LPF is composed of the resistor R13, the capacitor C11, and the capacitor C12.

The gate driving circuit 2a of the embodiment shorts the switch 32 when transferring from non-operating state to operating state of the charge pump circuit 1 shown in FIG. 7, and lowers the cut-off frequency of the primary LPF composed of the resistor R13, the capacitor C11, and the capacitor C12. In this state, waveforms of the output voltage V1 of the oscillator 20 of the gate driving circuit 2a, the output voltage V2 of the primary LPF, the output voltage V3 of the inverter circuit 22, and the driving voltages ΦD to Φ4 of the gate driving circuit 2 are shown in FIG. 9.

Figure 9:
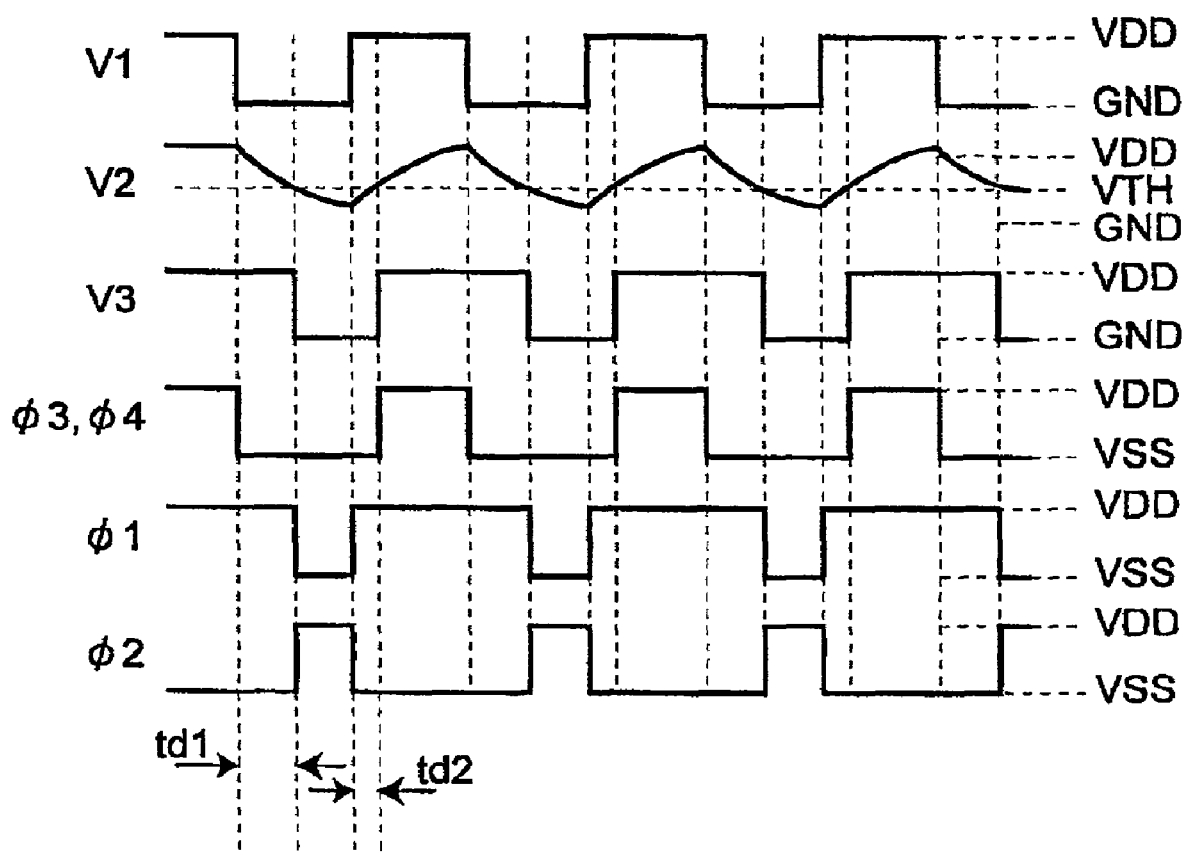
FIG. 9 is an operation waveform diagram of the gate driving circuit in second embodiment.

As shown in FIG. 9, rounding of the output voltage V2 of the primary LPF is larger as compared with FIG. 3 showing the first embodiment, and the dead times td1 and td2 are longer in duration. That is, the ON duty of the driving voltages Φ3 and Φ4 is lowered. When the ON duty of the driving voltages Φ3 and Φ4 are lowered and the driving voltages Φ1 to Φ4 are supplied in the charge pump circuit 1, the charging slope of output voltage VSS when starting of the charge pump 1 becomes moderate as shown in FIG. 6. Thus, by extending the duration of dead times td1, td2 and lowering the ON duty of switching transistors M3 and M4 of the charge pump circuit 1, the charging slope of output voltage VSS upon start of charge pump 1 can be made moderate, thereby displacement of potential of the output voltage Vout of the circuit block 3 supplied with the voltage VCC and GND as power source can be suppressed.

After transfer from non-operating state to operating state of the charge pump circuit 1, when starting operation of the circuit block 4 supplied with output voltage VSS of charge pump circuit 1 and voltage VCC as the power source, in order to raise the charging capability, the switch 32 is opened, and the ON duty of driving voltages Φ3 and Φ4 is raised to raise the charging efficiency of the charge pump circuit 1.

In the embodiment, the ON duty of switching transistors M3 and M4 of the charge pump circuit 1 is small, but not limited to this example. The gate driving circuit 2a may have a changeover circuit including the capacitor 12 and the switch 32 to decrease the ON duty of any one switching transistor out of the switching transistors M1 to M4, and may output driving voltages Φ1 to Φ4.

In the embodiment, a set of the capacitor C12 and the switch 32 is connected in parallel to capacitor C11, but a plurality of capacities and a plurality of switches may be provided in parallel to the capacitor C11, and the ON duty ratio may be changed in several steps, and the charging time to −VCC may be shortened.

In the gate driving circuit 2a, without using the capacitor C12 and the switch 32 and without changing the value of the capacitor C11 and the resistor R13, the ON duty can be lowered by raising the oscillation frequency of the oscillator 20, and same effects as in the embodiment are obtained.

In the semiconductor integrated circuit of the embodiment, the charge pump circuit 1 in FIG. 7 may be replaced with the charge pump circuit 1 shown in FIG. 4.

Third Embodiment

Figure 10:
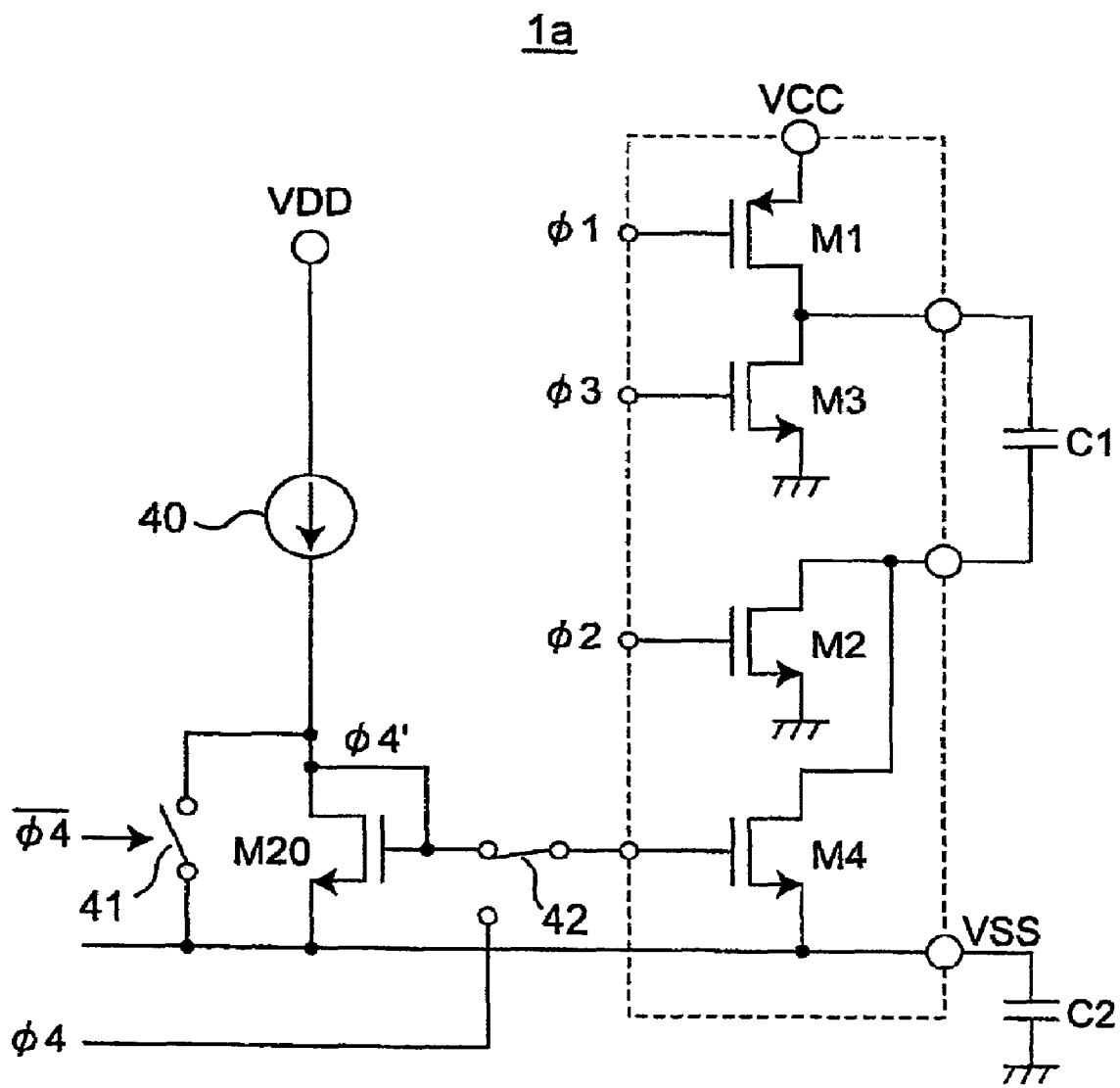
FIG. 10 is a circuit diagram of an internal configuration of a charge pump circuit in third embodiment.

FIG. 10 shows other structural example of the charge pump circuit included in the semiconductor integrated circuit of the invention. In the semiconductor integrated circuit of the embodiment, the structure other than the charge pump circuit 1a shown in FIG. 10 is same as that in the first embodiment shown in FIG. 1.

The charge pump circuit 1a of the embodiment further includes, in addition to the structure shown in FIG. 7, a current source 40, an N type MOS transistor M20 having one end connected to the current source 40, and other end connected to the output terminal of the charge pump circuit 1a, a switch 41 connected between the current source 40 and the output terminal of the charge pump circuit 1a in parallel to the N type MOS transistor M20, and a switch 42 for changing over whether to connect the gate of the switching transistor M4 to the driving voltage Φ4 output from the gate driving circuit 2 or to the gate of the N type MOS transistor M20.

When transferring from non-operating state to operating state of the charge pump circuit 1a, the charge pump circuit 1a connects the switch 42 to the gate of N type MOS transistor M20, and controls on and off of the switch 41 by an inverted signal of the driving voltage Φ4. In the charge pump circuit 1a of the embodiment, the charging amount to the output capacitor C2 is determined by the current amount Φ4' of the current source 40, OFF time of the switch 41, and ratio of gate width W/gate length L of the switching transistor M4 and the N type MOS transistor M20.

Figure 11:
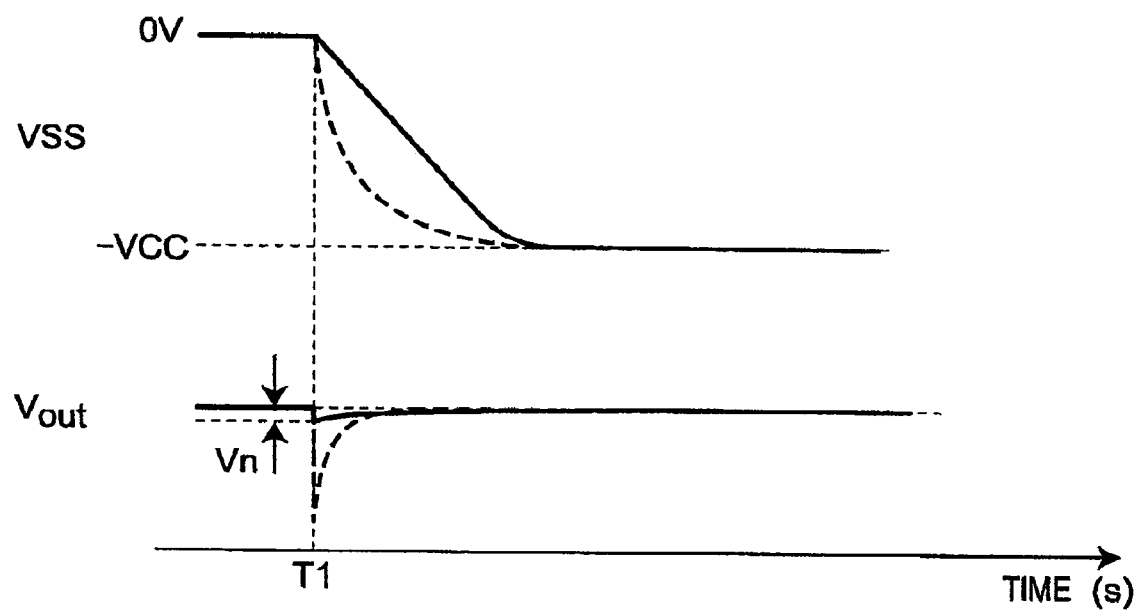
FIG. 11 is a waveform diagram of a transient characteristic of an output voltage VSS of the charge pump circuit, and an output voltage Vout of a circuit block operating between a power source and GND on same substrate, when the charge pump circuit in third embodiment transfers from non-operating state to operating state.

The solid line in FIG. 11 shows the transient response of the output voltage VSS of the charge pump circuit 1a for starting operation in a state in which the switch 42 is connected to the gate of N type MOS transistor M20, and the transient response of the output voltage Vout of the circuit block 3. In the diagram, the broken line shows the transient response of the output voltage VSS of the charge pump circuit 1a when starting operation in a state in which the switch 42 is connected to the driving voltage Φ4, and the transient response of the output voltage Vout of the circuit block 3.

As shown in the solid line in FIG. 11, when the charge pump circuit 1a transfers from non-operating state to operating state at the time T1, the switch 42 is connected to the gate of the N type MOS transistor M20. Charging of the output capacitor C2 is started at a small charging amount determined by current amount of the current source 40, OFF time of the switch 41, and ratio of gate width W/gate length L of the switching transistor M4 and the N type MOS transistor M20, and hence the charging slope of the output voltage VSS upon start of charge pump circuit 1a is moderate. As a result, it is possible to suppress the displacement of potential of output voltage Vout of the circuit block 3 supplied with the voltage VCC and GND in FIG. 1 as the power source.

After transfer from non-operating state to operating state of the charge pump circuit 1, when starting operation of the circuit block 4 supplied with output voltage VSS of the charge pump circuit 1a and the voltage VCC as the power source, in order to raise the charging capability, the switch 42 is connected to the driving voltage Φ4 side.

Thus, according to the configuration of the charge pump circuit 1a in the embodiment, the switching transistor M4 is used as secondary side transistor of the current mirror, and the charging current is limited to a constant value. Accordingly, at the time T1 of transfer from non-operating state to operating state of the charge pump circuit 1a, the output voltage VSS of the charge pump circuit 1a is suppressed in potential displacement. It is hence possible to suppress the displacement of potential of the output voltage Vout of the circuit block 3 supplied with voltage VCC and GND as the power source.

After transfer from non-operating state to operating state of the charge pump circuit 1, when starting operation of the circuit block 4, the current amount of the current source 40 may be increased instead of connecting the switch 42 to the driving voltage Φ4 side.

Figure 12:
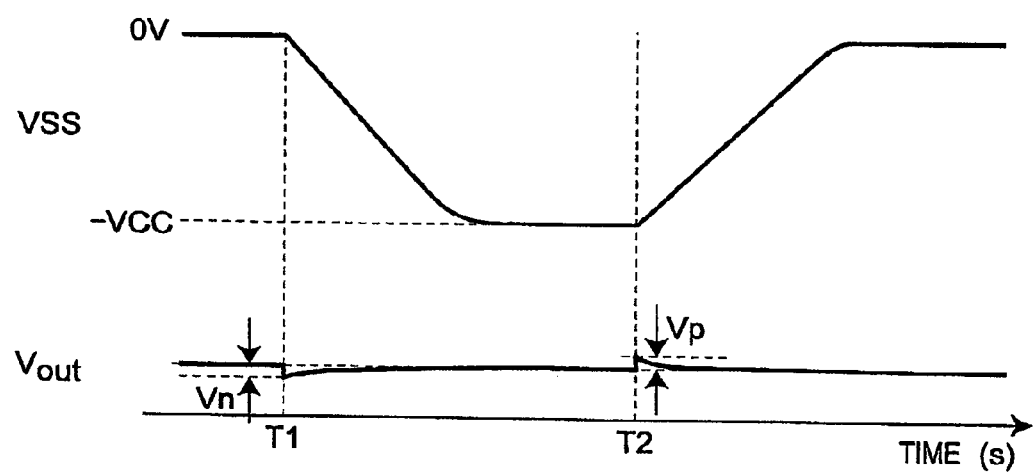
FIG. 12 is a waveform diagram of transient characteristic of the output voltage VSS of the charge pump circuit, and the output voltage Vout of the circuit block operating between the power source and GND on same substrate, when the charge pump circuit in first embodiment to third embodiment starts or stops operation.
Figure 13:
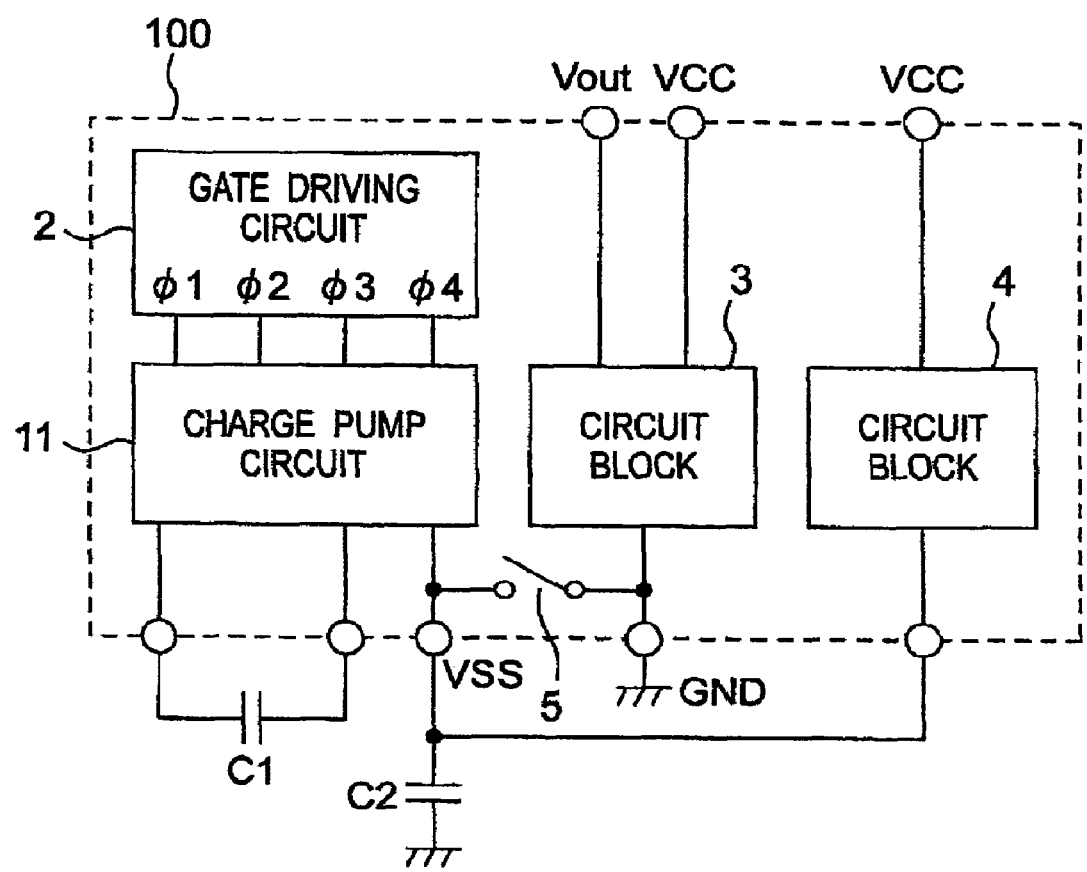
FIG. 13 is a block diagram of a structure of a semiconductor integrated circuit in prior art.
Figure 14:
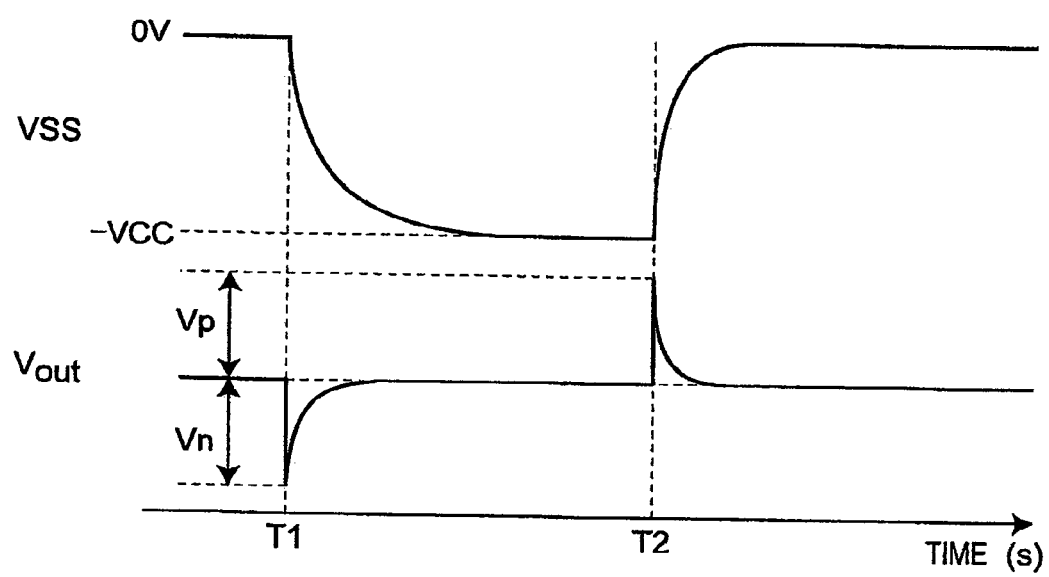
FIG. 14 is a waveform diagram of a transient characteristic of an output voltage VSS of a charge pump circuit, and an output voltage Vout of a circuit block operating between a power source and GND on same substrate, when the charge pump circuit in prior art transfers from non-operating state to operating state.

The semiconductor integrated circuit in the first embodiment to third embodiment may further have a delay circuit for turning on the switch 5 in FIG. 1 after a delay time from the moment of transfer from operating state to non-operating state of the charge pump circuit 1 or 1a. For example, the output capacitor C2 is gradually discharged by an idling current flowing into the output terminal of the charge pump circuit 1 or 1a. The switch 5 is turned on when the potential of output voltage VSS of the charge pump circuit 1 or 1a is sufficiently close to the GND level. In this case, waveforms of output voltage VSS of the charge pump circuit 1 or 1a and the output voltage Vout of the circuit block 3 are shown in FIG. 12. As shown in FIG. 12, the potential displacement of the output voltage VSS of the charge pump circuit 1 or 1a at transfer time T2 from operating state to non-operating state of the charge pump circuit 1 or 1a are moderate as compared with the conventional potential displacement shown in FIG. 14. The positive peak voltage Vp of output voltage Vout of the circuit block 3 in FIG. 12 is suppressed more than the peak voltage Vp in FIG. 14. Thus, by turning on the switch 5 after a delay time from transfer moment from operating state to non-operating state of the charge pump circuit 1 or 1a, it is effective to suppress potential displacement of output voltage VSS of the charge pump circuit 1 or 1a and output voltage Vout of the circuit block 3 at transfer time T2 from operating state to non-operating state of the charge pump circuit 1 or 1a.

In the semiconductor integrated circuit in the first embodiment to third embodiment, the charge pump circuit 1 or 1a is of negative voltage type, but also in the charge pump circuit of boost-up type, by suppressing potential displacement of output voltage upon start, it is possible to suppress potential displacement of output voltage of the circuit block operating independently from the charge pump circuit.

The semiconductor integrated circuit of the invention has an outstanding effect of suppressing sudden changes of output voltage when starting and stopping of operation of the charge pump circuit, and it is extremely useful for a portable appliance in which the circuit block driven by output voltage of the charge pump circuit, and the circuit block not requiring output voltage of the charge pump circuit are mounted on a same substrate.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2006-185259, filed on Jul. 5, 2006, which is expressly incorporated herein by reference in its entirety.

What is claimed is:

1. A semiconductor integrated circuit comprising:
    a charge pump circuit that is connected to a first capacitor and a second capacitor, charges the first capacitor with an input voltage, transfers a charge accumulated in the first capacitor to the second capacitor, outouts, as an output voltage, a voltage of the second capacitor, and is capable of changing over a capability of charging the first or second capacitor;
    a first circuit block that receives a positive voltage and a grounding potential, as a power source; and
    a second circuit block that receives the positive voltage and the output voltage of the charge pump, as a power source,
    wherein the charge pump circuit includes:
    a first switching transistor that connects one end of the first capacitor with the input voltage;
    a second switching transistor that connects the one end of the first capacitor with the grounding potential;
    a third switching transistor that connects the other end of the first capacitor with the grounding potential;
    a fourth switching transistor that connects the other end of the first capacitor with the second capacitor;
    a fifth transistor having a drain and a gate connected to any one gate of the first to fourth switching transistors, and having a source connected to any one source of the first to fourth switching transistors;
    a current source that supplies a current to the drain of the fifth transistor; and
    a changeover circuit that changes over a period during which the current of the current source flows in the drain of the fifth transistor.

2. The semiconductor integrated circuit according to claim 1, further comprising a switch that connects the output of the charge pump circuit with the grounding potential at low impedance.

3. The semiconductor integrated circuit according to claim 1, wherein the first circuit block outputs an audio signal.

4. The semiconductor integrated circuit according to claim 1, wherein the second circuit block outputs a video signal.

* * * * *